United States Patent [19]

Geiger

[11] Patent Number: 5,117,126

[45] Date of Patent: May 26, 1992

[54] STACKED OPTICAL PARAMETRIC OSCILLATOR

[75] Inventor: Allen R. Geiger, Las Cruces, N. Mex.

[73] Assignee: La Sen, Inc., Las Cruces, N. Mex.

[21] Appl. No.: 544,597

[22] Filed: Jun. 27, 1990

[51] Int. Cl.⁵ .......................... H03F 7/00; H01S 3/10
[52] U.S. Cl. ..................... 359/330; 372/21; 372/22; 359/328
[58] Field of Search ............... 307/424, 425, 428, 427; 372/21, 22, 3

[56] References Cited

U.S. PATENT DOCUMENTS

| | | | |
|---|---|---|---|
| 3,609,389 | 9/1971 | Bjorkholm | 307/428 |
| 3,628,186 | 12/1971 | Ashkin | 307/428 |
| 3,644,845 | 2/1972 | Harris | 307/428 X |
| 4,200,808 | 4/1980 | Herbst | 307/425 |
| 4,349,907 | 9/1982 | Campillo et al. | 372/92 |
| 4,739,507 | 4/1988 | Byer et al. | 372/22 |
| 4,807,240 | 2/1989 | Goldstone | 372/69 |

Primary Examiner—Georgia Epps
Attorney, Agent, or Firm—Kramer, Brufsky & Cifelli

[57] ABSTRACT

A stacked OPO is disclosed wherein two or more optically nonlinear media, such as crystals, are coaxilly disposed in a single resonator. Incident radiation is coupled into the resonator, and causes parametric oscillations of the two crystals. The two crystals are independently tuned, such as by angular orientation, to produce distinct components of secondary radiation. A first one of the crystals is disposed nearer to the source of incident radiation, and a second one of the crystals is disposed nearer to the output coupler of the resonator. This causes the first crystal to experience a greater effective gain. Furthermore, the secondary radiation from the first crystal will tend to dominate and "seed" the secondary radiation from the second crystal, when their bandwidths are narrowly separated. The dominance of the first crystal is controlled in various ways: 1) by shortening the length of the first crystal, 2) by differential bevelling of the first crystal with respect to the optical axis of the resonator, or 3) by detuning the output coupling mirror of the resonator with respect to the output of the first crystal. Either method effectively balances the effective gains of the two crystals so that two, independently tunable and efficient signal frequencies can be achieved. Seeding the OPO stack is also disclosed. Alternate techniques of seeding include the use of a tunable diode laser, a second low power OPO and a second OPO using a Faraday Anomalous Dispersion Optical Filter (FADOF). Techniques for angle tuning the OPO stack and compensating for walkoff are disclosed.

20 Claims, 7 Drawing Sheets

STACKED OPTICAL PARAMETRIC OSCILLATOR

TECHNICAL FIELD OF THE INVENTION

The present invention relates to Optical Parametric Oscillators, hereinafter referred to as "OPOs".

BACKGROUND OF THE INVENTION

Very high power densities made available by lasers have made it possible to observe the nonlinear behavior of optical media, such as crystals. Frequency doubling is an example of such nonlinear behavior. Frequency doubling is a specific example of what is known as the sum-frequency generation process, and occurs when an incident radiation of frequency v, on propagating through some crystalline materials, emerges as radiation consisting of a mixture of two frequencies, the original frequency v and a new frequency 2v.

The inverse of the aforementioned sum-frequency process is the optical parametric process, wherein incident radiation having a frequency v, on propagating through a nonlinear medium is converted into two lower frequency (higher wavelength) waves, which are of essentially variable frequency.

Optical parametric systems can be used to generate secondary (parametrically generated) radiation from a monochromatic coherent (incident) primary radiation by means of parametric interaction with an optically nonlinear medium. The secondary radiation has two components, one of which typically has a shorter wavelength than the other, although it is possible that both of the two components can have the same wavelength. This condition is known as "degeneracy". The wavelengths of both secondary radiation components are longer than that of the primary radiation. The wavelength of a secondary radiation component can be freely selected and can be adjusted by a suitable arrangement, typically by rotation of the optically nonlinear medium within the optical resonator of the parametric system. The wavelength of the other component will be determined based on energy conservation. The optical parametric system and be used in combination with a coherent source of primary optical radiation, for example a laser to provide a source of optical radiation whose wavelength can be selected more or less as desired within a desired frequency range.

In a parametric oscillator, the relationship between the "pump" frequency ($f_p$) of the incident radiation and the "signal" ($f_s$) and "idler" ($f_i$) parametrically generated component frequencies is given as: $f_p = f_s + f_i$ As the OPO is tuned away from "degeneracy", wherein the signal and idler frequencies are equal, the signal and idler wavelengths change, with the former (signal wavelength) decreasing and the latter (idler wavelength) increasing. Further, as the OPO is tuned well away from degeneracy, the signal and idler wavelengths become well separated, a consequence of which is that their indices of refraction will differ.

Usually, crystals are used as the optically nonlinear medium. Examples of crystals exhibiting the desired nonlinear effects are $KDP$, $LiNbO_3$, $Ba_2Na(NbO_3)_5$ or $LiO_3$. Since these nonlinear media exhibit relatively weak parametric interaction, it is known to locate the nonlinear medium within an optical resonator formed by mirrors, so that the radiation passes repeatedly through the medium. However, this creates a substantial problem with respect to coupling radiation into and out of the resonator. Hence, it has been known to employ mirrors, defining the resonator, which are highly transmissive for the primary radiation and highly reflective for the secondary radiation. This requirement is difficult to meet, when the parametric arrangement is intended to be continuously tunable regarding the wavelength of the secondary radiation, since the mirrors have to be highly reflective at a region close to the wavelength of the primary radiation, and the range of high reflectivity should be wide over a wide range of wavelengths. In practice, the reflectivity should be on the order of 80 to 95%. Even the most highly developed dichroic mirrors, made of multiple dielectric layers, only partially meet this requirement, and then only at great cost.

U.S. Pat. No. 4,639,923 describes an Optical Parametric Oscillator (OPO) using a urea crystal. This crystal makes the OPO broadly tunable, so that the entire spectral range from the ultraviolet to the near infrared is accessible. Further, the urea OPO is angle-tunable, and has a high efficiency.

U.S. Pat. No. 4,085,335 describes an optical parametric device wherein the coupling means, or arrangement in the parametric system, includes a dichroic mirror located in the path of the optical resonator, which dichroic mirror is arranged at an inclination with respect to the path of radiation within the resonator. The mirror has a high reflectivity for the primary radiation and a high transmissivity for the secondary radiation.

U.S. Pat. No. 4,180,751 describes a mode-locked optical parametric oscillator apparatus wherein the OPO cavity length is substantially smaller than the pump laser cavity length and in which the oscillator mirrors are singly resonant at either the signal or idler (pulse) frequencies. This configuration is intended to generate non-resonated OPO pulses which replicate mode-locked pump pulses, and both sets of pulses couple to the resonated OPO pulse over a relatively wide tuning range without adversely affecting OPO operation.

Thus, it is seen that an OPO may be used to generate secondary radiation having a wavelength significantly offset from the primary radiation. In many instances, the weaker component ($f_i$) of the secondary radiation is shunted, in that it is not of interest and is not independently tunable with respect to the stronger ($f_s$) component.

In certain applications, it would be desirable to generate an optical beam (secondary parametric radiation) having two independently tunable and efficient wavelength components. For instance, two-photon spectroscopy is an example of where this would be desirable. Reference is made to commonly-owned, copending U.S. patent application No. (Atty. Docket No. JEN-101), entitled *MID-INFRARED LIGHT HYDROCARBON DIAL LIDAR*, filed on even date herewith, wherein the utility of generating a single beam with two discrete components in the mid-infrared range is desirable. The first component is from 3.16 to 3.18 microns and may be suitable for atmospheric methane detection. The second, is between 3.38 and 3.51 microns, where ethane, propane and butane can be detected.

Clearly, two independently tunable primary (signal) frequencies could be obtained with OPOs by splitting the incident radiation from a single laser source into two paths, each interacting with a separate OPO, and recombining the outputs of the OPOs. However, the optics required to form two OPO resonators, as well as the beam splitting and recombining optics, would be prohibitively expensive. Furthermore, the energy of the incident beam would be split and shared by the two discrete OPOs, and higher laser power would be required to achieve the same effect in each of the secondary radiation beams. This too would add to the cost of such a system.

DISCLOSURE OF THE INVENTION

It is therefore an object of the present invention to provide a technique for generating an output (secondary radiation) from an OPO having two independently tunable and efficient wavelength components.

It is a further object to provide such an OPO, without unduly increasing the complexity and cost of the optical components.

It is a further object to provide such an OPO without unduly increasing the size, energy and cost of the laser source.

According to the invention, two or more optically nonlinear media, such as crystals, are coaxially disposed in a single resonator. Incident radiation is coupled into the resonator, and causes parametric oscillations of the two crystals. In the main hereinafter, a stacked OPO employing two crystals is discussed.

According to an aspect of the invention, the two crystals are independently oriented to produce distinct secondary radiation. While each crystal will generate two components of secondary radiation, each of which is of a longer wavelength than the incident radiation, in the main hereinafter only one of the components, the "signal" component ($f_s$) for each of the crystals is discussed.

Inherently, a first one of the crystals is disposed nearer to the source of incident radiation, and a second one of the crystals is disposed nearer to the output coupler of the resonator. This causes the first crystal to experience a greater effective gain. Furthermore, the secondary radiation from the first crystal will tend to dominate and "seed" the secondary radiation from the second crystal, when their bandwidths are narrowly separated.

Therefore, according to an aspect of the invention, the dominance of the first crystal is controlled in one of two ways.

In one method of controlling the dominance of the first crystal, the first crystal is shortened with respect to the second crystal to reduce its gain. A small, such as 10% reduction in the length of the first crystal, relative to the second crystal, will achieve a balance in the effective gains of the two crystals.

In another method of controlling the dominance of the first crystal, the resonator cavity is detuned with respect to the signal wavelength of the first crystal. This can be achieved by carefully coating the output coupling mirror so that its reflectivity is higher in the output region of the second crystal. By lowering the reflectivity of the output coupling mirror a small amount, such as 5%, with respect to the output of the first crystal, a balance in the effective gains of the two crystals can be achieved.

The stacked OPO uses modifications to the resonator cavity to produce multiple wavelengths from an OPO using a single pump wavelength. Each output wavelength can be wavelength tuned independently of the other.

In the usual case, by placing two crystals in an OPO cavity, the second crystal will amplify the output of the first crystal. However, by modifying the Q (resonance Quality) of the cavity selectively and/or the gain length of the media, the crystals can be made to operate independently.

In controlling the cavity Q, the cavity is designed to "bleed" energy selectively. The pump beam drives the first crystal harder than the second because the first crystal depletes the pump energy after some oscillator build-up time. Thus, the energy arriving at the second crystal is less, and the resulting "seed" parametric photons form the first crystal will dominate or have more energy than the spontaneous photons generated by the second crystal. This situation can be overcome by coating the output coupler in such a fashion as to remove photons from the first crystal optical resonator selectively over those of the second crystal. In this manner, the first crystal runs less efficiently than the second crystal, and their outputs are effective equalized.

The gain length of the first crystal can also be controlled. This may be done by making the first crystal shorter than the second crystal, or by beveling the crystal faces at slightly different angles to the optical axis. In the first case, the gain length of the first crystal is reduced, so less pump depletion occurs. Thus the first crystal does not have the parametric gain that it otherwise could have, and the effective gains of the first and second crystals are equalized.

By differential beveling of the crystals, the coupling of the pump beam can be controlled. Again, this affects the parametric gain so that the effective gain of the first and second crystals can be equalized.

The advantage of stacking the crystals within a single resonator is that the OPO output is independently tunable and coaxial. Thus, a compact, multiple-wavelength system can be constructed.

The independently tunable outputs of the stacked OPO are useful in DIAL LIDAR, two-photon spectroscopy and CARS spectroscopy.

Seeding the OPO stack is also disclosed. Alternate techniques of seeding include the use of a tunable diode laser, a second low power OPO and a second OPO using a Faraday Anomalous Dispersion Optical Filter (FADOF).

Techniques for angle tuning the OPO stack and compensating for walkoff are also disclosed.

Other objects, features and advantages of the invention will become apparent in light of the following description thereof.

DETAILED DESCRIPTION OF THE INVENTION

Figures 1, 1A:
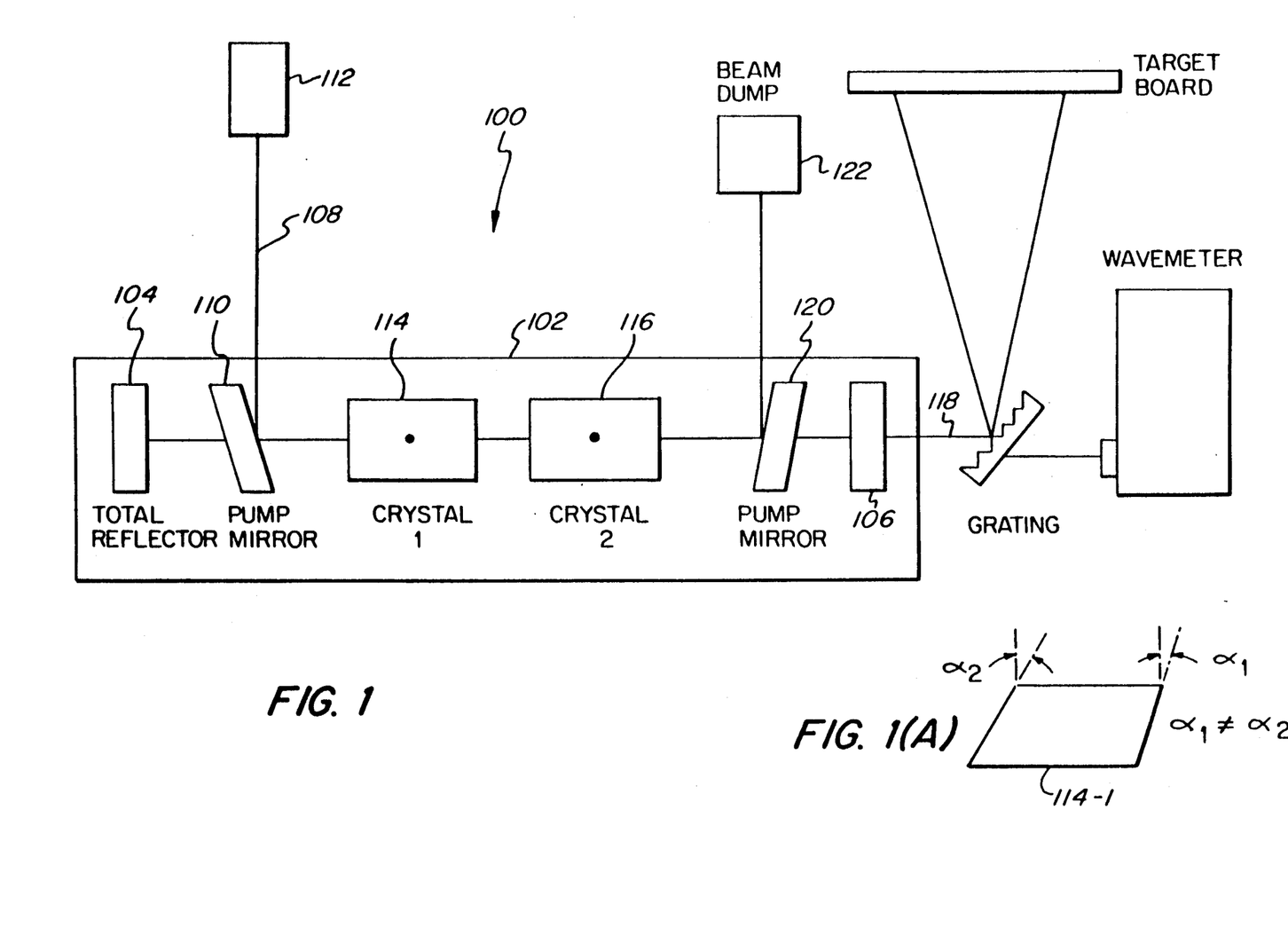
FIG. 1 is a schematic of a stacked OPO, according to the present invention.
FIG. 1(A) shows the two crystal faces beveled at different angles.

FIG. 1 shows a stacked OPO assembly 100. A resonant cavity 102 is formed between a totally reflective mirror 104 and an output coupling mirror 106.

A pump beam 108 is introduced into the OPO cavity with a brewster mirror 110. The pump beam is generated by a coherent source 112, such as a laser. For purposes of this illustration, the pump beam has a wavelength of 1.06 microns.

Two nonlinear optical media, such as crystals 114 and 116, are disposed in the optical path between the mirror 110 and the output coupler. In this example, the nonlinear optical media are Beta Barium Borate (BBO) crystals. The crystals 114, 116 are rotated such that their optical axes are not aligned with each other. This nonalignment of the optical axes will produce an output beam 118 containing the two distinct signal frequencies, $f_{s1}$ and $f_{s2}$, of the two crystals 114 and 116, respectively.

One of the crystals, the crystal 114, is disposed nearer the pump mirror 110, and the other crystal 116 is disposed nearer to the output coupler 106. Another mirror 120 is disposed in the optical path between the second crystal 116 and the output coupler 106, and directs the idler frequencies, $f_{i1}$ and $f_{i2}$, of the crystals 114 and 116, respectively, to a beam dump 122.

Due to the finite bandwidth and gain of the first crystal, if the second crystal's (116) optical axis is such that the bandwidth of the second crystal 116 overlaps the bandwidth of the first crystal 114, the second crystal 116 will attempt to "lock on" to the output of the first crystal 114. In a sense, the first crystal's (114) output will act as a 'seed' signal for the second crystal. Also, the pump beam is depleted by the first crystal before reaching the second crystal, which will cause the second crystal to have less gain than the first crystal. In this sense, the second crystal tends to be dominated by the first crystal.

the dominance of the first crystal 114 can be controlled by controlling the effective gain of the first crystal 114. This can be accomplished in two ways.

In one method of controlling the dominance of the first crystal, the actual gain length of the first crystal can be matched to that of the second crystal by sizing (cutting) the first crystal such that its actual length is shorter than that of the second crystal. The length of the first crystal then becomes a function of the rate of the pump pulse depletion, which is a function of the length of the resonant cavity and the pump pulse duration. A small, such as 10% reduction in the length of the first crystal relative to the second crystal can effect this purpose. Instead of changing its actual length, the two crystal faces can be beveled at slightly different angles, i.e. $L_1$ and $L_2$ as shown in FIG. 1(a).

In another method of controlling the dominance of the first crystal, the first and second crystals are of the same length, and the resonator cavity is detuned relative to the desired output of the first crystal. This can be achieved by carefully coating the output coupling mirror 106 so that the reflectivity of the mirror is higher in the output region of the second crystal. This causes the first crystal to have a "lossy" cavity, and hence less gain associated therewith.

Figure 2:
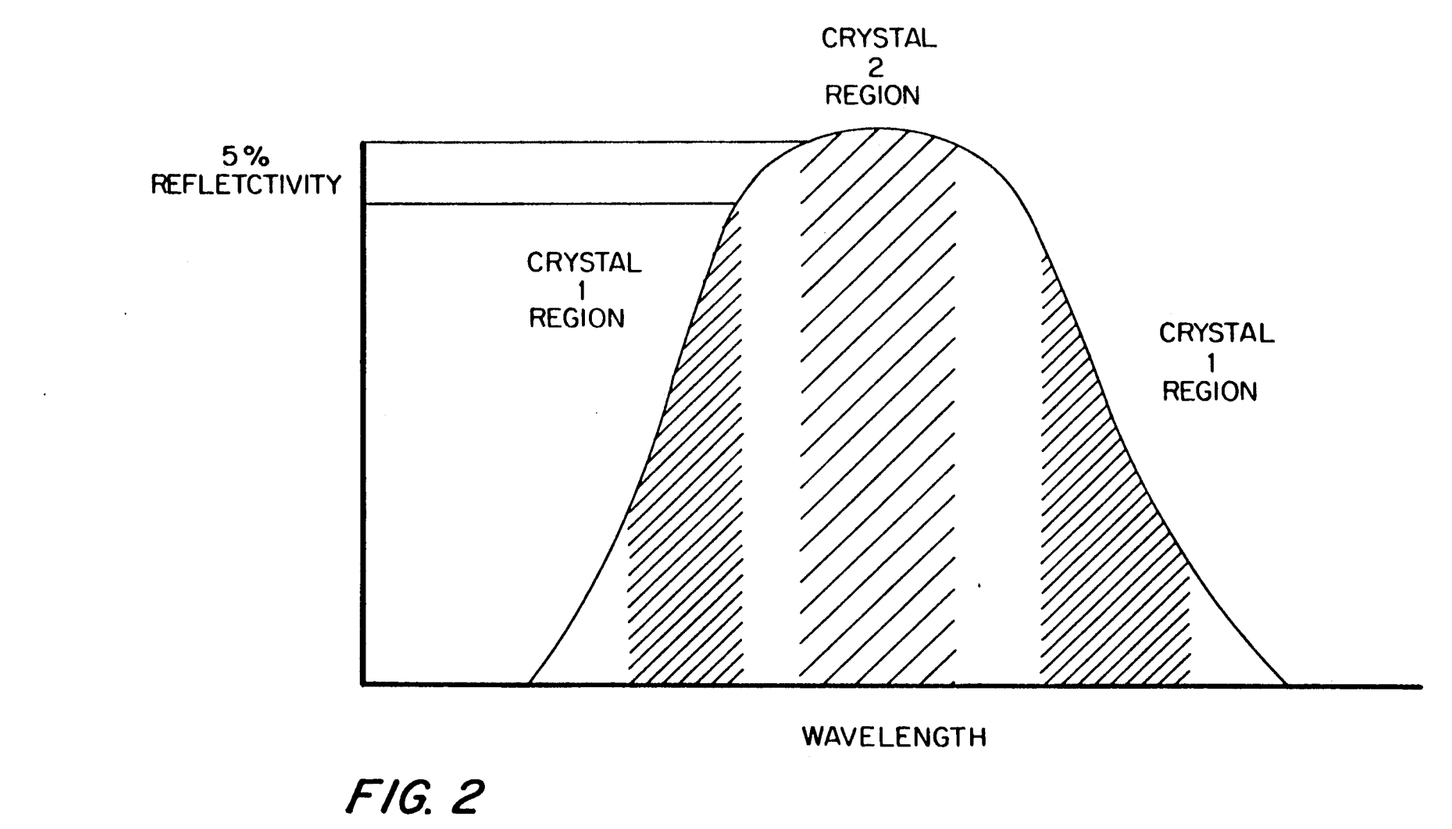
FIG. 2 is a graph of reflective of the output coupling mirror for a stacked OPO, according to the present invention.

FIG. 2 shows the characteristics for the output coupling mirror 106, detuned with respect to the first crystal. Wavelength is illustrated on the horizontal axis, and reflectivity of the output coupling mirror 106 is illustrated on the vertical axis. As can be seen, the reflectivity of the mirror is established to be maximum at the desired wavelength (signal frequency $f_{s2}$) of the second crystal, and drops off at either side of that wavelength. The reflectivity in the crystal 1 region ($f_{s1}$) is lower, such as 5% lower than the peak reflectivity in the crystal 2 region. It is well within the ambit of those skilled in the art to which this invention most nearly pertains to create a mirror having the desired reflectivity characteristics. By establishing the output coupler reflectivity so that it is slightly more reflective with respect to crystal 2, the effective gains of the two crystals can be equalized, even with equal length crystals.

In the manner described above, the stacked OPO can generate two discrete wavelength outputs, one from each crystal. The range of each crystal is virtually unlimited, and a wide separation between the two wavelengths is attainable. For instance, it is possible to have output components in the blue-green (about 460 micrometers) and red (600 micrometers) regions. Since the output of the stacked OPO is coaxial, a prism can be used to separate the output beam components if desired, such as for measuring their respective intensities.

The stacked OPO allows a single pump laser to drive a multi-output OPO assembly, generating multiple wavelengths simultaneously. In the context of a DIAL LIDAR system, such as described in the aforementioned copending U.S. patent application No. 07/539,230, this will allow an increase in the Lidar signal-to-noise ratio by minimizing effects caused by atmospheric speckle and differential albedos. Using OPO stacking will also lessen the Lidar's weight by minimizing the driver lasers and their support equipment. This weight saving may amount to 10 to 15% of the total system weight, and will result in direct operational cost savings.

The nonlinear optical medium illustrated above is Barium Borate (BBO), but the stacked OPO will work with other nonlinear media, such as MgO:LiNbO$_3$ and KTP. Barium Borate has good infrared properties in being transmissive out to beyond 4.0 Micrometers, and may be preferred in some applications over BBO for generating infrared wavelengths longer than 3.3 micrometers. However, MgO:LiNbO has two problems which the BBO does not suffer from: one, temperature instability; and two, oxygen sensitivity. With respect to the latter, it is necessary to contain the crystal in an inert environment, such as in Nitrogen or Argon. Further, it will drift in wavelength as it is heated, and absorption of the laser pulse within the crystal can cause internal fluctuations in temperature. However, this effect can be minimized through the use of photoacoustic cross-sectional calibration. Yet further, MgO:LiNbO has a large walk off angle. Hence, if the pump beam is small, the resulting radiation produced by the OPO will be refracted away from the pump beam and limit the gain of the crystal.

KTP does not suffer from the same problems as LiNbO$_3$. However, there are problems associated with ferro-electric domaining, and KTP is relatively expensive.

It is within the scope of the present invention that disparate optical media can be employed in the construction of a stacked OPO. Further, more than two crystals can be used.

A unique feature of the stacked OPO is that the bandwidth of the output beam can be increased. Most laser systems have a set bandwidth. By increasing the bandwidth, the effective cross section of an interrogated medium, such as the atmosphere, can be increased.

FIG. 3 shows a DIAL LIDAR 50, incorporating stacked OPOs according to the present invention.

A first pulsed laser source 52, such as a Nd:YAG laser, emits a pump pulse which is directed into an OPO stack 54. The OPO stack 54 includes three media, such as crystals 56,57,58, and is constructed according to the techniques described above. The OPO stack 54 emits an output pulse 60, containing three independently tunable wavelengths, such as in the mid-infrared range.

A second pulsed laser source 62, such as a Nd:YAG laser, emits a pump pulse which is directed into a second OPO stack 64. The OPO stack 64 includes three media, such as crystals 66,67,68, and is constructed according to the techniques described above. The OPO stack 64 emits an output pulse 70, containing three independently tunable wavelengths, such as in the mid-infrared range.

The output pulses 60 and 70 are offset in time, such as by 50 microseconds, as shown in the timing diagram accompanying FIG. 3, and are combined, such as with a beam splitter 72 into a single output beam 74 containing all six independently tunable wavelengths.

A small portion 76 of the output beam 74 is directed to a receiver portion of the DIAL LIDAR, and the remaining portion 78 is transmitted into the atmosphere, e.g. for the detection of light hydrocarbons.

In the receiver section, the reflected beam, or return 80, is collected in a telescope 82, and is appropriately conditioned by conditioning optics 84. From thence, the return is passed through a beam splitter 86, where it is effectively "mixed" with the portion 76 of the transmitted beam 78.

A trichroic mirror 88 is disposed in the optical path of the receiver to split off one wavelength each from the first and second stacked OPOs 54 and 64. The outputs of photoacoustic cells 90 and 92, tuned to these two wavelengths, are combined with the return, which is provided to a first detector 94, for analysis of the LIDAR return at those two wavelengths.

A dichroic mirror 98 is disposed in the optical path of the receiver to split off another one wavelength each from the first and second stacked OPOs 54 and 64. The outputs of photoacoustic cells 100 and 102, tuned to these two wavelengths, are combined with the return, which is provided to a second detector 104, for analysis of the LIDAR return at those two wavelengths.

The remaining return 106, containing the remaining two wavelengths each from the first and second stacked OPOs 54 and 64, is provided to a beam splitter 108, which also receives the output of photoacoustic cells 110 and 112. The output of the beam splitter 108 is provided to a third detector 114 for analysis of the LIDAR return at those two wavelengths.

Thus, the utility of the stacked OPO of the present invention is clearly demonstrated in that the outputs of two laser sources can be used to generate six independently tunable outputs for purposes such as DIAL LIDAR.

INJECTION SEEDING

Although the OPO stack is capable of simultaneously outputting two or more wavelengths, these wavelengths may be fairly broad in terms of spectral linewidth. A solution to overcome this line broadening is to injection seed the OPO. Injection seeding has been used in connection with lasers, but using it with an OPO presents a problem in that the OPO is not a fixed wavelength source, and therefore the injected signal must also be tuned in order for the injection locking to be successful. As described hereinafter, the OPO can be seeded at either the signal or idler wavelengths.

Figure 4A:
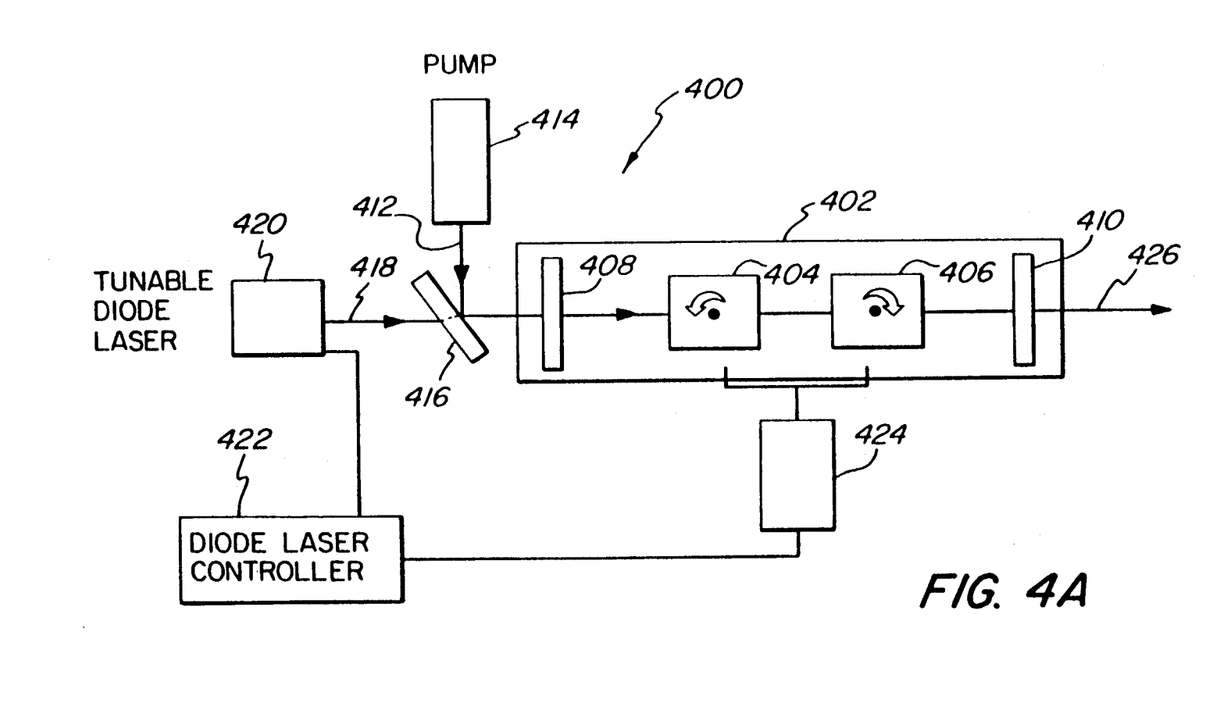
FIG. 4A is a schematic of a seeding arrangement for a stacked OPO, according to the present invention.
Figure 4B:
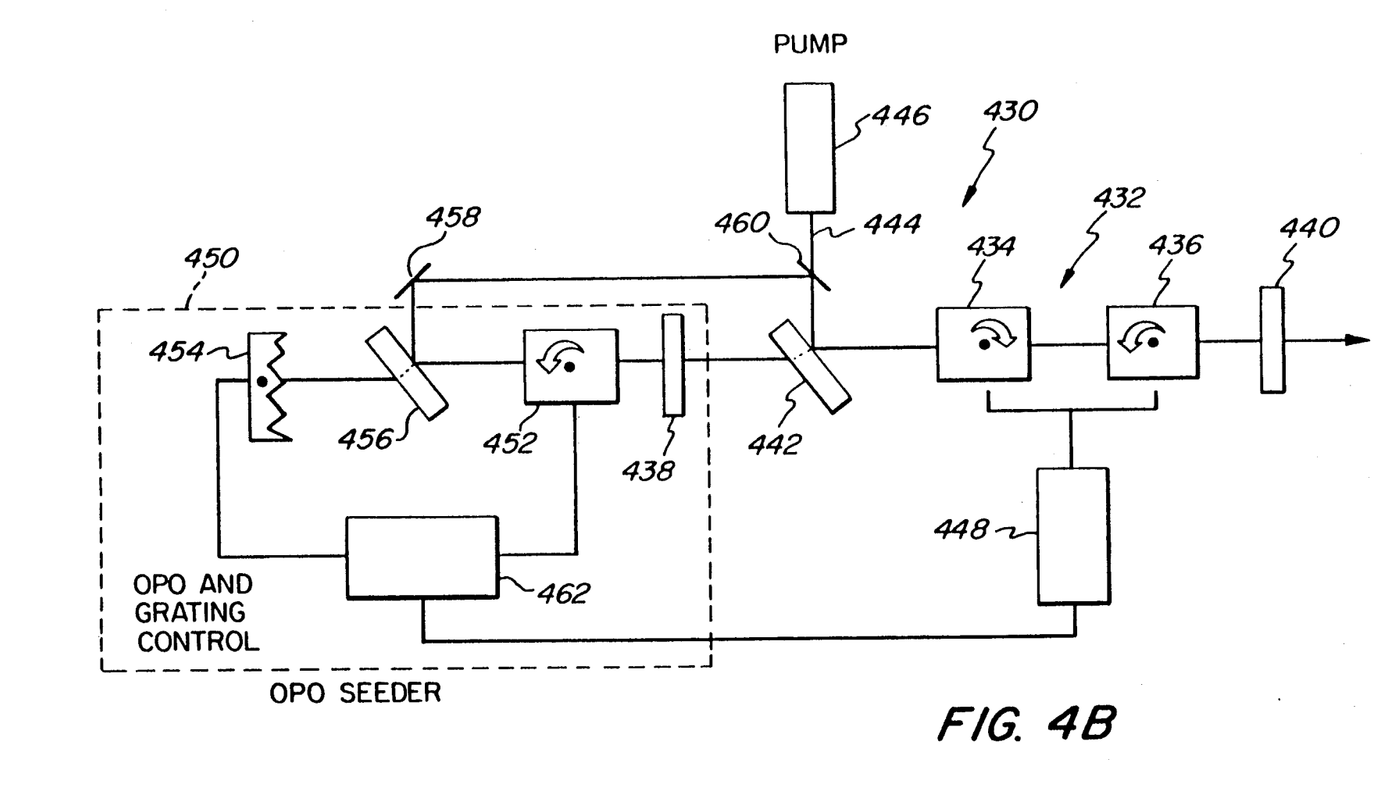
FIG. 4B is a schematic of an alternate seeding arrangement for a stacked OPO, according to the present invention.

FIGS. 4A and 4B illustrate two methods of a tunable injection seeding of the idler wavelength, and energy extraction at the signal wavelength.

FIG. 4A shows a system 400 for tunable injection seeding of a stacked OPO 402. The OPO 402 contains two crystals 404 and 406 aligned on an optical path between an input mirror 408 and an output mirror 410. Notably, in this example, the input beam is brought in through the input mirror 408, rather than in the optical path between the two (input and output) mirrors, as was the case in the OPO 102 of FIG. 1. Thus, the input mirror 408 is not totally reflective (as was the mirror 104 of FIG. 1), but rather is one-way transmissive (into the OPO).

A pump beam 412 is generated by a coherent light source, such as a laser 414, and is combined by a beam combining mirror 416, such as a brewster mirror, with a seed beam 418. The combined pump and seed beams are directed through the input mirror 408 along the optical axis of the OPO 402.

The seed beam 418 is generated by a tunable diode laser 420, operating under the control of a diode laser controller 422 which receives as an input a signal generated by an OPO angle or temperature sensor 424.

The tunable diode laser 420, which is temperature or angle tuned, emits radiation at the signal wavelength ($f_s$). Seed photons cause the OPO to line narrow to the linewidth of the seed diode laser. This line narrowing occurs to both the signal wavelength and the idler wavelength. For example, a diode laser at 1.5 um could seed a BBO OPO and line narrow the signal output at 460 nm in the blue-green portion of the spectrum. Or, the diode laser at 1.5 um could seed a KTP or LiNbO$_3$ OPO at the signal wavelength and narrow the idler output at 3.0 um. The OPO output beam is shown at 426.

By tuning the seeding diode laser, the OPO would tune over the bandwidth of the OPO. Or, the OPO could be temperature or angle tuned itself, and the diode laser would also tune, thereby maintaining a narrow linewidth.

Using current technology, diode laser seeding is difficult because of the low energies available from diode laser (420) relative to the intense energies available to the OPO from the pump pulse beam (412). However, injection locking can occur if the OPO is initially operated at low pump power, near its threshold of operation, and seeded. Once line narrowing has occurred, the pump energy can be increased, and line narrowing will be maintained.

FIG. 4B shows a system 430 illustrating a second method of seeding. A stacked OPO 432 is shown comprising two crystals 434 and 436, and input mirror 438, an output mirror 440 and a brewster mirror 442 disposed in the optical path between the input and output mirrors, much like the OPO 102 shown in FIG. 1. A pump beam 444 is directed into the OPO via the brewster mirror 442 (as in FIG. 1) and the input mirror 438 is partially one way transmissive (similar to the mirror 408 in FIG. 4A). An OPO angle or temperature sensor 448 is provided (as in FIG. 4A).

The method illustrated in FIG. 4B uses a second OPO and a line narrowing element to produce a seeding source. A low energy OPO 450 is constructed to produce a narrow linewidth seed beam 452 for injection through the input mirror (438) of the first OPO 432. The second OPO 450 comprises a single crystal 452 disposed between an input grating 454 and an output mirror 438 (which is the input mirror of the first OPO 432). A brewster mirror 456 is disposed between the input grating 454 and the output mirror 438, and receives a portion of the pump beam 444. (The pump beam 444 is split between the first and second OPOs by beam splitting mirrors 458 and 460.) The input grating 454 is tunable to function as a line narrowing element.

The input mirror of the first OPO 432 serves an additional function as the output mirror of the second OPO 450, and hence is partially one way transmissive, into the first OPO 432.

An OPO and grating control 462 controls the operation of the second OPO 450, in response to the output of the temperature or angle sensor 448.

In this second method, illustrated in FIG. 4B, although the seeder (second) OPO energy is low in a pulsed system, this energy would be higher than that of a diode laser seeder (FIG. 4A).

Figure 5:
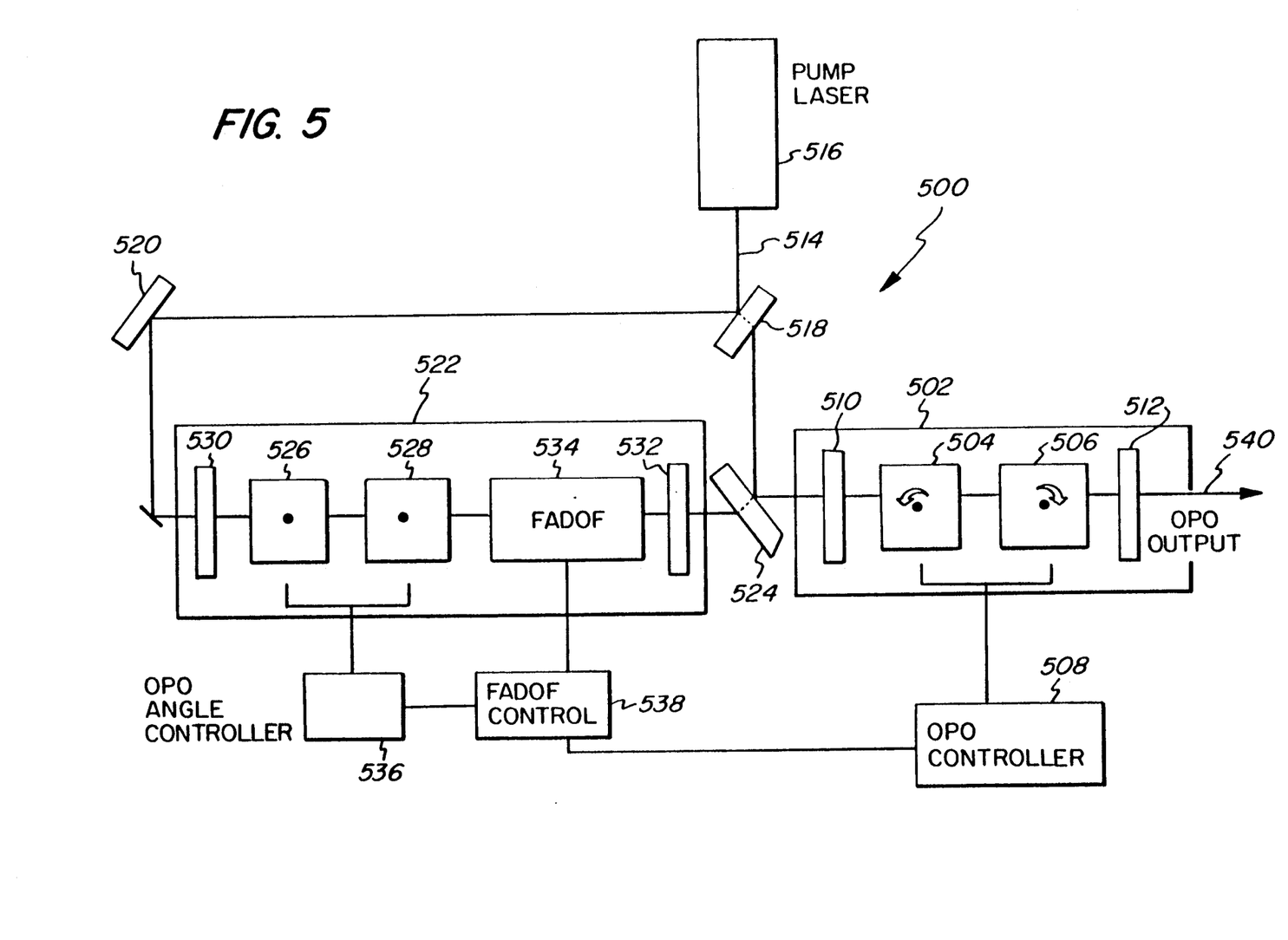
FIG. 5 is a schematic of an alternate seeding arrangement for a stacked OPO, according to the present invention.

FIG. 5 shows an alternate arrangement 500 for injection seeding an OPO stack, using multiple diode or OPO seeders. A first OPO 502 (to be seeded) includes two crystals 504, 506 which are angle or temperature tunable by an OPO controller 508. The crystals 504, 506 are aligned on an optical path between a partially transmissive input mirror 510 and an output mirror 512. A pump beam 514 is provided by a coherent light source, such as a laser 516, and is split by mirrors 518,520 between the first OPO 502 and a second (seeder) OPO 522. A portion of the input beam 514 is introduced to the first OPO by a brewster mirror 524.

The second (seeder) OPO 522 includes two crystals 526, 528 aligned along an optical path between an input mirror 530 and an output mirror 532, and includes a Faraday (or Stack) Anomalous Dispersion Filter (FADOF) 534 disposed between the crystals and the output mirror. The crystals are angle tunable, under the control of an OPO angle controller 536. The FADOF 534 is controlled by a FADOF control 538 which is also responsive to the OPO controller 508.

The FADOF 534 has the ability to act as a very narrow line optical filter, which can be tuned over a limited range by tuning the magnetic or electric field, as the case may be. As the FADOF is tuned, the tuning of the seeder OPO 522 will follow, providing a narrow line-tunable seeder for the seeded OPO 502. A unique feature of the FADOF seeder OPO is that the FADOF is a molecular activated device and, as such, if absorption or similar molecular phenomena are being examined (i.e., by the OPO output 540), the FADOF can be made to match the molecular optical characteristics under examination. Also, the FADOF can contain multiple gases which will cause the seeder OPO 522 to emit multiple seeding lines which can be used to narrow a multi-element stack using a single seeder.

ANGLE TUNING AND WALKOFF

Figure 6:
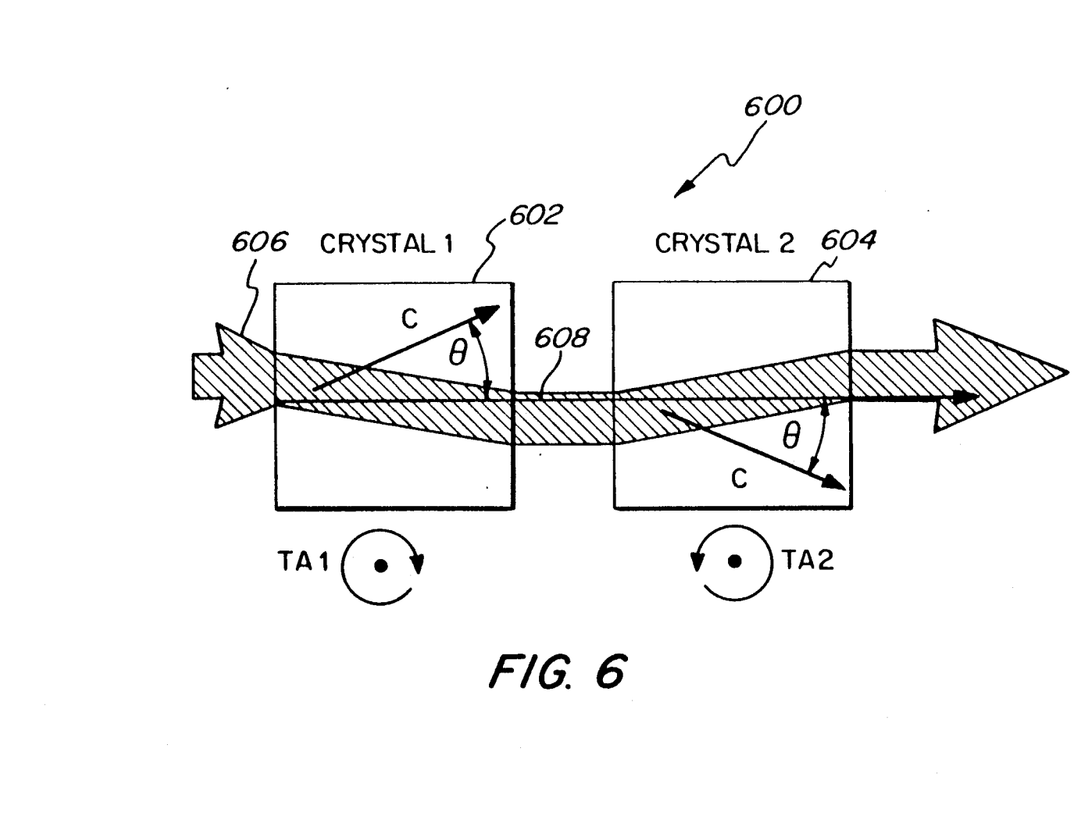
FIG. 6 is a schematic of two crystals in an OPO, illustrating angle tuning and walkoff.

As mentioned, it is advantageous that the crystals in the OPO stack are angle tunable. FIG. 6 illustrates how, by appropriate crystal orientation, tuning can be accomplished while compensating for walkoff.

Walkoff is a phenomenon where the extraordinary beam generated by the OPO crystals literally "walks off" the ordinary parametrically generated beams. In the past, walkoff has been treated as a "fact of life", and the only means of reducing its effects was by the use of non-critical phase matching, where tuning can be accomplished by altering the temperature of the crystal(s). This is not possible with some crystals, such as with BBO.

FIG. 6 illustrates a technique 600 of reducing walkoff with two BBO crystals 602, 604. The crystals are arranged so that one compensates for the walkoff induced by the other. More particularly, the two crystals are placed so that their optical axes are at twice the phase-matching angle with respect to one another. The walk off of the extraordinary beam 606 (shown striped) in "Crystal 1" 602 is compensated by propagation through "Crystal 2" 604, where the pump beam walks on to the ordinary beam 608 (shown as a solid line). Tuning is accomplished by rotating the crystals in opposite directions about their respective tuning axes (TA1 and TA2).

What is claimed is:

1. A stacked optical parametric oscillator, comprising:
    two or more nonlinear optical media for sustaining optical parametric oscillation coaxially disposed in a resonator;
    an optical source for providing incident radiation at a primary wavelength;
    an input mirror for coupling the incident radiation into the resonator and through the two or more nonlinear optical media; and
    an output mirror disposed at one end of the resonator for coupling secondary radiation generated by the nonlinear optical media in response to the incident radiation out of the resonator, the secondary radiation containing different signal and idler wavelengths for each of the two or more nonlinear optical media.

2. A Stacked Optical Parametric Oscillator according to claim 1, wherein:
    the nonlinear optical media are crystals.

3. A Stacked Optical Parametric Oscillator according to claim 2, wherein:
    the crystals are formed of Barium Borate.

4. A Stacked Optical Parametric Oscillator according to claim 2, wherein:
    the crystals are formed of $MgO:LiNbO_3$.

5. A Stacked Optical Parametric Oscillator according to claim 2, wherein:
    two crystals are disposed in the resonator, a first one of the crystals disposed nearer to the input mirror and a second one of the crystals disposed nearer to the output coupling mirror.

6. A Stacked Optical Parametric Oscillator according to claim 5, wherein:
    the first crystal is sufficiently shorter than the second crystal to effect a balance in the effective gain of the two crystals.

7. A Stacked Optical Parametric Oscillator according to claim 6, wherein:
    the first crystal is approximately 10% shorter than the second crystal.

8. A Stacked Optical Parametric Oscillator according to claim 5, wherein:
    the output coupling mirror is detuned with respect to the output of the first crystal to effect a balance in the effective gain of the two crystals.

9. A Stacked Optical Parametric Oscillator according to claim 8, wherein:
the output coupling mirror is detuned on the order of 5% with respect to the output of the first crystal.

10. A Stacked Optical Parametric Oscillator according to claim 5, wherein:
the first crystal is beveled sufficiently differently than the second crystal, with respect to the optical axis of the resonator, to effect a balance in the effective gain of the two crystals.

11. A stacked optical parametric oscillator comprising:
two or more optical media for sustaining optical parametric oscillation coaxially disposed in a resonator;
a first optical source for providing a pump beam through the two or more nonlinear optical media;
a second optical source for directing a seed beam through the two or more nonlinear optical media; and
an output mirror disposed at one end of the resonator for coupling secondary radiation generated by the two or more nonlinear optical media in response to the pump beam out of the resonator, the secondary radiation being narrowed in linewidth in response to the seed beam.

12. A Stacked Optical Parametric Oscillator according to claim 11, wherein:
the second optical source includes a tunable diode laser.

13. A Stacked Optical Parametric Oscillator according to claim 12, wherein:
the second optical source includes a relatively low power optical parametric oscillator.

14. A Stacked Optical Parametric Oscillator according to claim 13, wherein:
the second optical source includes a FADOF.

15. A stacked optical parametric oscillator comprising:
two or more nonlinear optical media for sustaining optical parametric oscillation coaxially disposed in a resonator;
an optical source for providing incident radiation at a primary wavelength;
an input mirror for coupling the incident radiation into the resonator and through the two or more nonlinear optical media;
an output mirror disposed at one end of the resonator for coupling secondary radiation generated by the two or more nonlinear optical media in response to the incident radiation out of the resonator, the secondary radiation containing different output wavelengths for each of the two or more nonlinear optical media; and
wherein said two or more nonlinear optical media are crystals, wherein the output wavelengths of the crystals are independently tunable and wherein a first one of the crystals is disposed nearer to the input mirror and a second one of the crystals is disposed nearer to the output mirror.

16. A stacked optical parametric oscillator according to claim 15, wherein:
the output wavelengths of the two crystals are independently tunable, by selective orientation of the crystals about their axes.

17. A stacked optical parametric oscillator comprising:
two or more nonlinear optical media for sustaining optical parametric oscillation coaxially disposed in a resonator;
an optical source for providing incident radiation at a primary wavelength;
an input for coupling the incident radiation into the resonator and through the two or more nonlinear optical media;
an output mirror disposed at one end of the resonator for coupling secondary radiation generated by the nonlinear optical media in response to the incident radiation out of the resonator; and
wherein said two or more nonlinear optical media comprise two crystals, wherein the two crystals are oriented so that the walk-off in one crystal is compensated by the walk-off in the other crystal and wherein a first one of the crystals is disposed nearer to the input mirror and a second one of the crystals is disposed nearer to the output mirror.

18. A stacked optical parametric oscillator comprising:
two or more nonlinear optical media for sustaining optical parametric oscillation coaxially disposed in a resonator;
a first optical source for providing a pump beam through 19. A stacked optical parametric oscillator comprising:
two or more nonlinear optical media for sustaining optical parametric oscillation coaxially disposed in a resonator;
a first optical source for providing a pump beam through the two or more nonlinear optical media;
a second optical source for directing a seed beam through the two or more nonlinear optical media, the second optical source including a relatively low power optical parametric oscillator; and
an output mirror disposed at one end of the resonator for the two or more nonlinear optical media;
a second optical source for directing a seed beam through the two or more nonlinear optical media, the second optical source including a tunable diode laser; and
an output mirror disposed at one end of the resonator for coupling secondary radiation generated by the two or more nonlinear optical media in response to the pump beam out of the resonator, the secondary radiation being narrowed in linewidth in response to the seed beam. coupling secondary radiation generated by the two or more nonlinear optical media in response to the pump beam out of the resonator, the secondary radiation being narrowed in linewidth in response to the seed beam.

20. A stacked optical parametric oscillator comprising:
two or more nonlinear optical media for sustaining optical parametric oscillation coaxially disposed in a resonator;
a first optical source for providing a pump beam through the two or more nonlinear optical media;
a second optical source for directing a seed beam through the two or more nonlinear optical media, the second optical source including a FADOF, and
an output mirror disposed at one end of the resonator for coupling secondary radiation generated by the two or more nonlinear optical media in response to the pump beam out of the resonator, the secondary radiation being narrowed in linewidth in response to the seed beam.

* * * * *

UNITED STATES PATENT AND TRADEMARK OFFICE
CERTIFICATE OF CORRECTION

PATENT NO. : 5,117,126                                        Page 1 of 2

DATED      : May 26, 1992

INVENTOR(S) : Allen R. Geiger

Figures 3A, 3B:
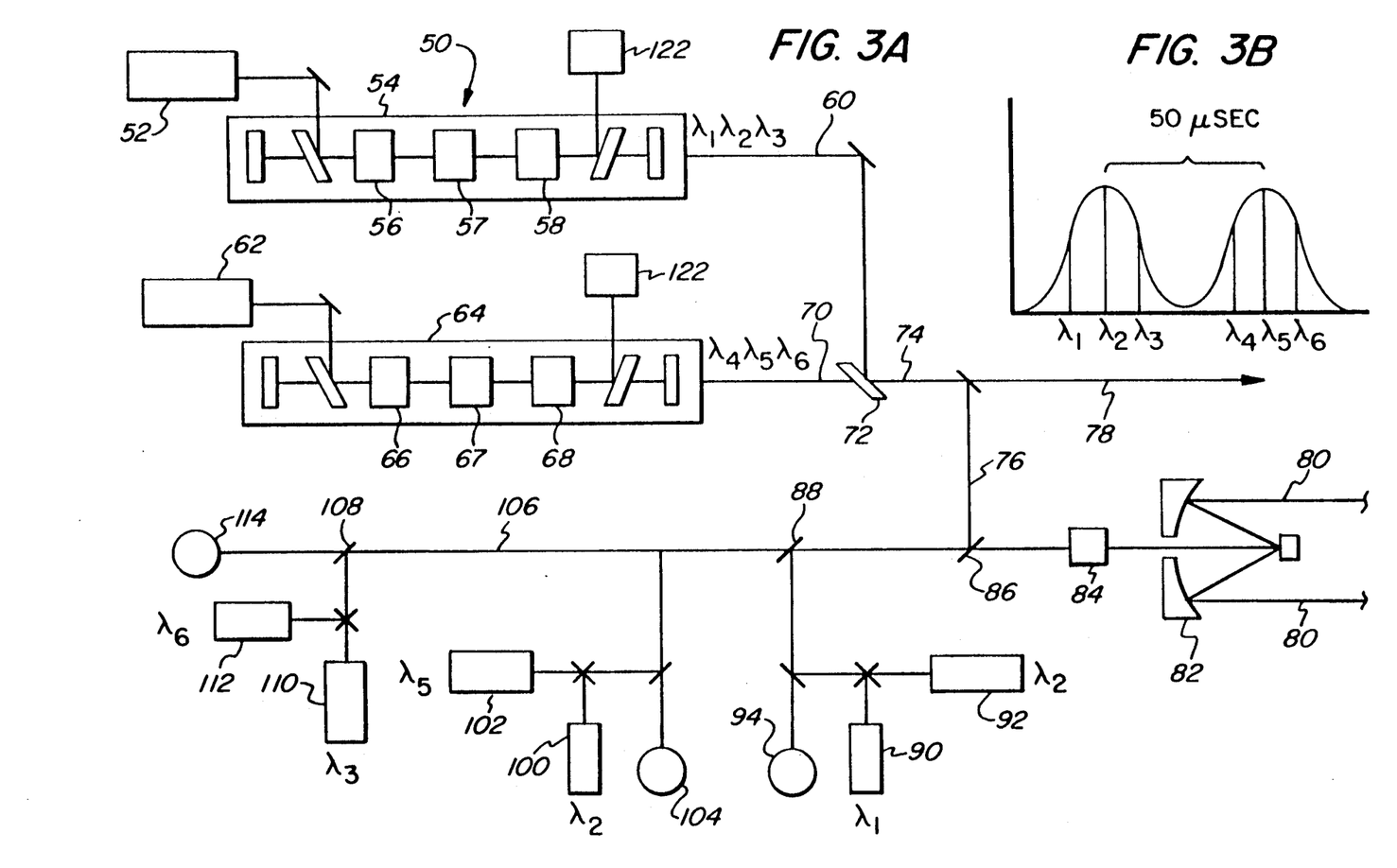
FIG. 3 is a schematic of a DIAL LIDAR system incorporating the stacked OPO of the present invention.

It is certified that error appears in the above-identified patent and that said Letters Patent is hereby corrected as shown below:

In column 4, line 58, change "FIG. 3 to -- FIG. 3A -- .

In column 4, before line 61, insert -- FIG. 3B is a graph of a timing diagram of the output pulses of the DIAL LIDAM system of FIG. 3A. -- .

In column 5, line 42, change "the" to -- The -- .

In column 7, line 22, after "diagram", insert -- of FIG. 3B     In column 7, line 23, delete "accompanying FIG. 3".

In claim 17, column 12, line 6, after "input", insert -- mirror -- .

In claim 18, column 12, line 26, after "through", insert -- the two or more nonlinear optical media;
    a second optical source for directing a seed beam through the two or more nonlinear optical media, the second optical source including a tunable diode laser; and
    an output mirror disposed at one end of the resonator for coupling secondary radiation generated by the two or more nonlinear optical media in response to the pump beam out of the resonator, the secondary radiation being narrowed in linewidth in response to the seed beam. --

UNITED STATES PATENT AND TRADEMARK OFFICE
CERTIFICATE OF CORRECTION

PATENT NO. : 5,117,126

DATED : May 26, 1992

INVENTOR(S) : Allen R. Geiger

It is certified that error appears in the above-identified patent and that said Letters Patent is hereby corrected as shown below:

In claim 19, column 12, line 39, after "for", delete the remainder of the claim, and insert the following in lieu thereof:

-- coupling secondary radiation generated by the two or more nonlinear optical media in response to the pump beam out of the resonator, the secondary radiation being narrowed in linewidth in response to the seed beam. --

Signed and Sealed this

Twenty-first Day of September, 1993

*Attest:*

BRUCE LEHMAN

*Attesting Officer*     *Commissioner of Patents and Trademarks*